United States Patent [19]

Skelton

[11] 4,386,681
[45] Jun. 7, 1983

[54] SAFETY DROP BRAKE

[76] Inventor: Colin W. Skelton, 160 Kilaben Rd., Kilaben Bay, New South Wales 2283, Australia

[21] Appl. No.: 952,741

[22] Filed: Oct. 19, 1978

Related U.S. Application Data

[63] Continuation of Ser. No. 798,978, May 20, 1977, abandoned.

[51] Int. Cl.³ .............................. B60T 1/04; B60T 1/14
[52] U.S. Cl. ..................................................... 188/4 R
[58] Field of Search ................................ 188/4 R, 4 B

[56] References Cited

U.S. PATENT DOCUMENTS

| 949,190 | 2/1910 | Mansell et al. | 188/4 R |
|---|---|---|---|
| 1,261,557 | 4/1918 | Kreuser | 188/4 R |
| 1,392,987 | 10/1921 | Unruh | 188/4 R |
| 2,014,565 | 9/1935 | Hartshorne | 188/4 R |
| 2,344,148 | 3/1944 | Jackson | 188/4 R |
| 2,868,333 | 1/1959 | Willison | 188/4 R |
| 2,887,185 | 5/1959 | Lee | 188/4 R |
| 3,078,963 | 2/1963 | Shea | 188/4 R |

FOREIGN PATENT DOCUMENTS

| 749767 | 1/1967 | Canada | 188/4 R |
|---|---|---|---|
| 24250 | of 1906 | United Kingdom | 188/4 B |

Primary Examiner—George E. A. Halvosa
Attorney, Agent, or Firm—Ladas & Parry

[57] ABSTRACT

An emergency braking apparatus for use with vehicles or trailers having dual coaxial wheels on either side thereof. The brake comprises a belt, one end of which is attached to the chassis at a suitable location so that the other, free, end when released, is run over by the inner of the dual wheels. The outer wheel remains in contact with the road, thus skidding is avoided.

9 Claims, 4 Drawing Figures

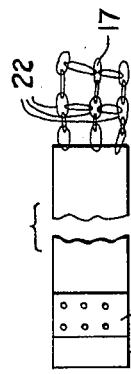
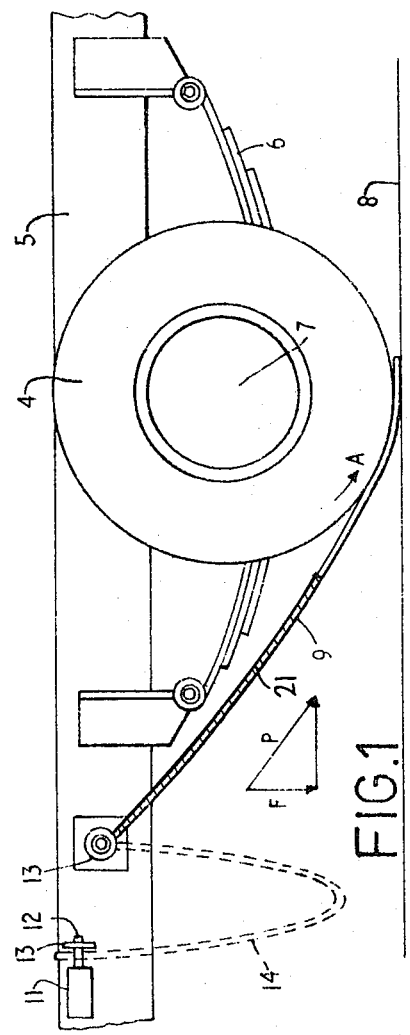
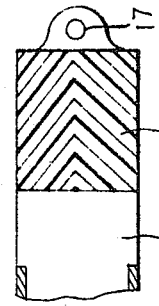
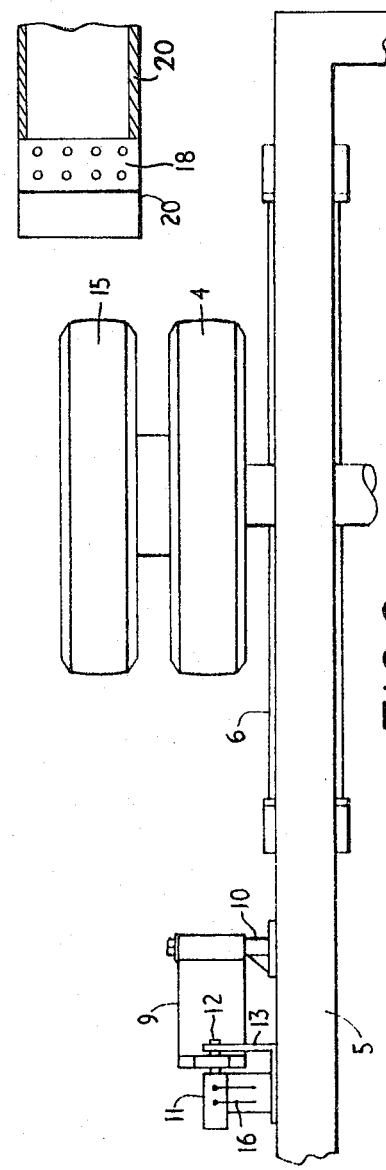

SAFETY DROP BRAKE

This is a continuation of co-pending Application Ser. No. 798,978 filed May 20, 1977, now abandoned.

This invention relates to an emergency braking apparatus and in particular to a safety drop brake for use on vehicles having dual wheels on each end of an axle.

Many emergency braking systems have been devised which rely on safety braking circuits and the like to ensure the normal brakes can be applied in times of emergency.

However all these types of systems, no matter how supposedly failsafe all suffer a common disadvantage, i.e. they all activate the normal brake linings or pads. Thus when such brake linings overheat and/or their co-efficient of friction is greatly reduced they cannot effectively brake the vehicle. Often a hydraulic brake line, or seal, may rupture making it impossible to activate the brakes.

It is an object of this invention to provide a braking apparatus independent of the normal braking means.

In one broad form the invention provides a drop brake for a vehicle or trailer having at least one coaxial interconnected multiple wheel arrangement on either side thereof, said brake being positioned on at least one side of said vehicle or trailer and comprising a belt of suitable material of sufficient length to extend at least from the intersection of the ground and a vehicle tire to a suitable point of connection on the vehicle; a support member for said belt and releasable holding means to release the free end of said belt or sheet when activated such that the free end of said belt drops to be run over by one of said wheels.

The principal advantage of this brake is that when mounted on a vehicle it provides an additional brake which is independent of the condition of the brake linings and normal braking system, and can be readily applied in an emergency situation if the normal braking systems have failed.

This brake of the invention is so readily produced that its cost is minimal compared to its lifesaving capabilities.

The concept of this brake is to locate a belt, which is attached to the body of the vehicle, or trailer, between the road surface and one of the tires on each side of an axle having dual wheels on each side. The dual wheels on each side are locked together so that if only one wheel is in contact with the ground the other wheel will still rotate. Thus, when the belt of the drop brake is interposed between the road surface and one of the wheels, the other wheel which is in contact with the road surface is forced to rotate due to the momentum of the vehicle. However as it rotates it drives the other wheel against the surface of the stationary belt. The friction of the wheel being driven against the belt provides the braking action to reduce the speed of the tire in contact with the road to an eventual stop.

Alternatively the axle may have one wide wheel on either end of the axle, instead of the dual wheels. In this instance the belt is designed so that when it is disposed between the tire and the road surface it only takes up a portion of the width of the tire. This ensures that the remaining portion of the tire will be forced into contact with the road surface to drive the tire against the fixed belt, thus slowing the vehicle to a stop.

The invention will now be described by way of example only with reference to the accompanying drawings wherein:

FIG. 1 is a side elevational view of a part of a vehicle embodying the invention;

FIG. 2 is a plan view of a part of a vehicle embodying the invention, and not corresponding to FIG. 1;

FIG. 3 is a diagram of a typical belt as used by the invention;

FIG. 4 is a diagram similar to FIG. 3 showing the use of chains.

The safety drop brake in accordance with this invention uses a belt 9 made of any suitable material. The belt 9 is attached at one of its ends to a support member 10 which is rigidly attached to the body 5 of the vehicle. The free (other) end of the belt is releasably attached to holding means which when actuated releases the free end of the belt 9. Once the free end of the belt 9 is released it drops to the ground 8 and is run over by the tire 4 wheel 7. The holding means may comprise a pin 12 which protrudes through a hole 17 in the end of the belt 9. The pin 12 has its ends held at receiving member 13 and actuating means 11. Alternately the holding means may comprise a releasable gripping means. The actuating means 11 may be electrical and/or mechanical and is triggered by the driver of the vehicle in an emergency. The triggering means would preferably comprise a cable or a switch located at a convenient position near the drivers seat.

The belt 9 is also shown by the dashed lines in FIG. 1 in its ready for use position 14 and by the unbroken lines in its in use braking position.

The positioning of the support member 10 may be at any point forward of the vertical plane through the axle axis 7, so that when the belt is released its free end it drops down and is run over by the tire to be located between the ground 8 and the tire 4.

A typical belt 9 is shown in FIG. 3. It may have a tread 19 on its road and/or tire contact surfaces. Alternatively it may have metal studs or chains at the portion 19 for use in snow or icy conditions. The belt can be attached to a hollow cylindrical member 20 by wrapping it around the member 20 and clamping it back onto itself by means such as a metal plate 18 and studs. The member 20 can simply be concentrically pushed onto the support member 10 for easy interchange of used belts. Thus if enough clearance is available between the member 20 and member 10, the member 20 may rotate as the belt is released.

When not in use this brake is usually held as shown by the dashed line in FIG. 1, as 14, and also shown in FIG. 2.

The drop-brake can be supplied for use with one or more of the tires on a vehicle axle, but preferably on each inside tire of a dual wheel axle as shown in FIG. 2.

When a truck driver is going to sleep in the cabin of his truck he may release the belt 9 of the brake so that if he accidentally kicks the hand brake off and/or the truck out of gear, the truck will only move a few feet before stopping.

If whilst driving a vehicle there is a loss of braking and the vehicle cannot be normally brought to a halt the driver would release the drop brake, by say a button, switch cable or other type of activating means within easy reach of the driving position. The pin 12 would be withdrawn from the hole 7 in the free end of the belt 9 by the actuating means 11. The belt 9 would then drop to the ground 8 and be run over by the inner wheel 4 rotating in the direction shown by the arrow A of FIG. 1. Thus a portion of the belt is disposed between the wheel 4 and the ground 8.

As the outer wheel 15 is still in contact with the ground 8 it continues to rotate and thus prevents a locking up and skidding of the wheels 4 and 15. Both wheels 4 and 15 are mechanically fixed together so that they must rotate at the same speed. As the wheel 4 draws the belt 9 tighter it exerts a greater tension on the belt 9. Also on drawing the belt downwards as shown by P in the vector diagram of FIG. 1 the vehicle 5 body is pulled down on the springs by a force F thus increasing the pressure between the tire 4, the belt 9 and the ground 8, and tire 15 and the ground 8, respectively thus increasing the braking on the vehicle.

The braking effect is substantially provided by the tire 15 in contact with the ground driving the inner tire 4 against the stationary belt, thus the rate of rotation of the tire 15 in contact with the road 8 is substantially and gradually slowed which slows the vehicle to a stop. The additional braking is also provided by the friction between the belt 9 and the ground 8.

The drop brake provided by the invention has shown to be an extremely foolproof and effective apparatus in use.

Once the drop brake has been used the belt 9 must be relocated at the pin 12 or replaced if it is excessively worn.

In most instances it is desirable to provide a drop brake at both the forward and rear sides of each axle so that provision is made for emergency stopping the vehicle in both forward and reverse directions.

The belt is preferably formed of three ply nylon or steel cord reinforcement encased in a rubber overlay.

It has been found that the optimum thickness of the belt is ⅜" inches.

This apparatus provides a brake the condition of which can readily be seen by the vehicle driver and is independent of the normal braking system.

The belt 9 in its ready for use position 14 can also act as a forward mud flap.

Where it is envisaged that the vehicle will be used in mud, snow, ice or similar conditions, studs may be attached to at least one side of the belt at the contact position. The studs provide extra traction, working on the same principle as chains on tires.

The belt may also comprise a mesh or chain 22 type strip with or without any rubber components.

The belt may have a series of holes for the dissipation of heat generated during stopping the vehicle.

Special hazard warning lights may be added to the rear of the vehicle to indicate when the drop brake has been activated.

It has been found that the area of contact between the belt 9 and the tire 4 affects the performance of the brake. If the area of contact is too great then the outer wheel 15 will not be able to turn sufficiently and a full skid may occur. This is obviously undesirable.

To overcome this problem the mounting 10 is moved either further forward with respect to the tire or closer to the ground to reduce the contact area.

Alternately, if there is insufficient contact area and the inner wheel 4 rotates two freely on the belt 9, then the outer wheel 15 will not be slowed down sufficiently quickly. If this is the case, then the mounting 10 is moved higher from the ground or closer to the tire to increase the contact area.

In the trails that have been carried out it has been found that a contact are covering an arc spanning about 40° of the tire is optimal.

A further feature which is preferred in some uses, is to place stiffening strips 21 along the belt between the mounting point and almost to the tire contact point, to ensure the belt is properly directed under the tire and does not flick out to the side of the tire.

What I claim is:

1. A drop brake for a vehicle or trailer having on either side thereof at least one dual wheel arrangement comprising two coaxial wheels which are rigidly interconnected to rotate together with both wheels in contact with the ground, said brake being positioned on at least one side of said vehicle or trailer and comprising a reinforced belt of suitable material having a fixed end and a free end and of sufficient length to extend at least from the intersection of the ground and a vehicle tire to a suitable point of connection on the vehicle; a support member for the fixed end of said belt and releasable holding means for holding the free end of said belt and actuable to release said free end so that the free end of said belt drops to be run over by one only of said wheels of each dual wheel arrangement which has a drop brake associated therewith, whereby the belt is interposed between the ground and said one wheel to retard rotation thereof by frictional drag between said one wheel and the belt while the other wheel remains in contact with the ground and continues to rotate, thus urging said one wheel further onto the belt to increase the frictional drag exerted on said one wheel by the belt.

2. The drop brake of claim 1 wherein the belt has at least a three ply nylon or steel cord core with a rubber overlay or each side of the core.

3. The drop brake of claim 2 wherein the belt has a series of holes in it at the area adapted to contact with the tire.

4. The drop brake of claim 1 wherein the belt has a series of holes in it at the area adapted to contact with the tire.

5. The drop brake of claim 1 wherein at least the portion of said belt adapted to be interposed between the road and tire incorporates chains.

6. The drop brake of claim 1 when placed on either side of said vehicle or trailer.

7. The drop brake of claim 1 wherein the belt is positioned so that the free end drops under the inner of the dual wheels.

8. The drop brake of claim 1 wherein the belt is positioned on the vehicle or trailer frame so that when its free end is located between the tire and the road the belt contact with the tire spans an arc of about 40°.

9. The drop brake of claim 1 wherein stiffening portions are incorporated into the belt to resist sideway movement.

* * * * *